Patented Apr. 18, 1939

2,155,103

UNITED STATES PATENT OFFICE 2,155,103

MANUFACTURE OF PRINTING INKS

Ramon N. Shiva, Chicago, Ill.

No Drawing. Application October 10, 1936,
Serial No. 105,090

4 Claims. (Cl. 134—35)

The present invention relates to improvements in the manufacture of printing inks.

One of the primary objects of the present invention is to incorporate printing inks of the oleoresinous and oily types with water in the form of a water-in-oil emulsion, the water being introduced in the form of a highly colloidal hydrous gel.

A further object of the invention is to improve printing inks by incorporating therewith a highly colloidal hydrous aluminum hydroxide gel and thereby to extend the ink as a result of the incorporation thereinto of water in dispersed form.

A further object of the invention is to improve printing inks by mixing therewith aluminum hydroxide in highly colloidal form carrying a large amount of water, thereby to produce printing inks of improved qualities.

Still a further object of the invention is to prepare printing inks without the use of any pigments but, on the contrary, by means of dyes and highly hydrous gels as, for example, aluminum hydroxide in colloidally dispersed highly hydrous form.

Still further objects will become apparent from the description hereinbelow and the claims appended to this application.

In carrying out the present invention, advantage is taken of the fact that it is possible to prepare aluminum hydroxide in the form of a highly colloidal, highly hydrous gel. Such a gel may form the basis of the printing ink itself or may advantageously be employed as an adjuvant which is incorporated with the ink to increase its brilliance, coloring power, spreadability and ease of drying, to render it less likely to offset than is usually the case, and to render the resultant printed characters substantially scratch-proof.

While various types of hydrous gels may be employed, such for example as silica gel, starch gel, karaya gum gels, tragacanth gels, and similar substances, it is preferable to employ for the present purpose a special type of aluminum hydroxide in highly colloidal gel form, such as is produced by the patent to Paul S. Moyer, No. 1,958,710, of May 15, 1934. In order to distinguish this particular type of aluminum hydroxide gel and to shorten the further description herein, this material will be called "collagel."

It has been found to be highly desirable to incorporate the collagel with the colors used for making the ink, while the colors are in the form of a well dispersed paste or pulp, the amount of collagel added being so proportioned that upon subsequent evaporation of the water originally contained in the wet pulp, this water will be replaced by whatever amount of water is contained in the collagel. It is believed that the adsorption of the water on the collagel is so strong that when a mixture thereof with the wet color pulp is dried, particularly when using a vacuum, it is the water contained in the interstices of the pulp that evaporates preferentially over the water that is adsorbed on the collagel. However, the present invention is not to be limited by this theory, which is expressed merely to explain partially the effects obtained by the present process.

Broadly speaking, the process comprises the mixing of a wet pulp of the desired coloring matter with a suitable quantity of the collagel, followed by removal of some of the moisture from the mixed materials, preferably by evaporation under a vacuum, so as to remove substantially the amount of water originally contained in the pulp.

The principle of the invention can be still more accurately ascertained from an examination of various specific formulas for the manufacture of different types of ink. The main point to be kept in mind is the removal of the moisture which was contained in the original color pulp.

In order to simplify the nomenclature herein, color pulp which has been treated with collagel, as above described, will hereinafter be referred to as "gelized" pulp.

After the pulp has been gelized, various drying-oil materials may be added thereto, there also being incorporated a certain amount of an emulsifying agent, and oxidizing agents for the oils added, so that the finished material therefore will comprise substantially gelized pulp, drying oils, oxidizing agents, and an emulsifying agent.

The following examples are given as illustrations of the invention but without any intention of limiting the same thereby.

EXAMPLE I.—YELLOW INK

*Component A*

28 parts by weight of a damp pulp containing about 53.18% of actual yellow pigment, which may be a lake of the usual type known in this art. These 28 parts will therefore contain about 14.89 parts by weight of dry color solids.

12 parts by weight of collagel having an $Al_2O_3$ content of about 5%.

These two materials are thoroughly mixed together in a suitable mixer until a uniform mixture is obtained, aggregating about 40 pounds. This mixing is preferably done in a vacuum tank, or the pulp after being mixed can be transferred to a vessel capable of being pumped relatively free of air, and the water is evaporated from the mixture at the lowest possible temperature at which this can be practically effected, until enough water has been removed to leave about 26.89 parts by weight of material.

Component B 11 parts by weight of what is known in the printing art as "polymerized oil," containing about 5% of triethanolamine stearate (hydroxy triethanolamine tristearate) mixed with about 4 parts by weight of a manganese lead acetate resinate.

The polymerized oil consists of a mixture of what is known in the trade as No. 1 linseed oil and No. 3 litho varnish, both of these materials being well known commercial products readily identified by any manufacturer of printing inks. The individual materials of Component B are thoroughly blended with each other until uniform.

The ink is then made by blending Component A and Component B in the usual manner in a suitable mixer, then preferably running it through a roller-mill, or other device, until a perfectly smooth mixture has been obtained. This forms the finished product.

EXAMPLE II.—RED INK

7½ parts by weight of a pulp red, which is a water paste containing a red lake and contains about 22.6% of total solids, are mixed with 3.25 parts of collagel consisting of about 95% water and about 5% aluminum oxide. After these two materials are blended, an amount of moisture equivalent to the moisture content of the pulp—that is, 5.8 parts by weight—are evaporated therefrom while the material is maintained under as high a vacuum as is commercially practicable. The actual yield therefore is about 4.95 parts of gelized pulp. To this there are added 4.75 parts of the polymerized oils mentioned in connection with Example I, these also containing about 5% of the triethanolamine tristearate and about 1.27 parts of the same oxidizing agent consisting of manganese and lead acetates and resinates. Alternatively, a cobalt linoleate oxidizing agent containing about 4% of cobalt may be used in place of the manganese lead materials. It should be noticed that these oxidizing agents are also well known commercial materials which have long been used in the manufacture of printing inks. The total amount of ink yielded by this formula will be 10.97 parts.

It will also be obvious that all of the ingredients may be incorporated with each other prior to the evaporation of the water from the mixture, and such a procedure will be considered as within the scope of the present invention.

EXAMPLE III.—BLACK INK

Black ink can be made without the use of any color pulp. In order to produce this, one may, in accordance with the present invention, proceed as follows, using two different components:

Component A 32 parts by weight of collagel,
9.75 parts by weight of dry carbon black.

The materials are thoroughly ground together until a uniform mixture has been secured.

Component B 9 parts by weight of boiled linseed oil containing about 5% of triethanolamine tristearate,
9 parts by weight of polymerized linseed oil (litho varnish) containing about 5% of triethanolamine tristearate,
4 parts by weight of No. 1 litho varnish containing about 5% of triethanolamine tristearate,
4 parts by weight of No. 3 litho varnish free from triethanolamine tristearate,
14 parts by weight of cobalt linoleate, containing about 4% of cobalt,
20 parts by weight of manganese-lead resinate oxidizing agent, and
8 parts by weight of what is known in this art as "blue toner" or "reflex blue." Methyl violet blue toner may be substituted therefor.

The materials of Component B are thoroughly mixed with each other, whereupon Components A and B are blended together, while at the same time adding, as Component C, 4 parts by weight of petrolatum or petroleum jelly. The final mixture thus obtained is an excellent half-tone process ink.

It is also possible to proceed in a somewhat similar manner for the production of yellow and blue inks in which dyestuffs are used instead of pulp colors. As a further alternative, for these dyestuffs may be substituted what is known as dispersed colors, which are aqueous suspensions of very highly colloidally dispersed pigments.

EXAMPLE IV.—YELLOW INK BY MEANS OF DYES

Component X 4 parts by weight of collagel and
1 part by weight of soluble dye (in this case auramine yellow conc.).

These two materials are thoroughly incorporated with each other.

Component Y 2.5 parts by weight of No. 1 litho varnish containing about 5% of of triethanolamine tristearate,
2.5 parts by weight of No. 3 litho varnish containing about 5% of triethanolamine tristearate,
3 parts by weight of manganese-lead resinate oxidizing material.

Components X and Y are then carefully blended, thus producing the finished ink. This is of a very brilliant transparent color and can be used directly for printing, it having been found that it does not strike through the paper, notwithstanding the considerable amount of water contained therein. It would appear that the auramine or other dye becomes in some way adsorbed upon the aluminum hydroxide of the collagel.

If blue ink is desired, the 1 part of auramine in the above formula may be substituted by ½ part of Lithosol blue 6 G (Du Pont).

Other colors may, of course, be used with corresponding results, and it is believed that the above description of the individual examples will be sufficient to enable those skilled in the art to compound the ingredients in accordance with the present invention.

It is not definitely known in what form the water exists in the finished product, but it is most probable that the water is dispersed in the form of individual minute droplets while the oily components form the continuous phase. It is, however, by no means impossible that some of the oil is also dispersed in the aqueous phase. When carefully examined, the ink appears to be perfectly homogeneous, and it will not wet with water the material to which it is applied, but acts very much the same as though it were all on an oily base. Its ease of spreading and rapidity of drying, however, are much enhanced, and there is less offset than there is with ordinary inks compounded entirely of oleaginous materials. The printed characters are also much more scratch-proof.

The primary feature of the invention therefore resides in the incorporation of a highly hydrous gel, such as is exemplified by the above mentioned collagel, with printing ink materials so as to extend the same and to improve their properties.

In the hereunto appended claims the term "hydrous gel" is used in the broad generic sense and is intended to cover any highly hydrated colloidal gel which will function in an equivalent manner to the collagel specifically recited in the examples. In claims containing the word "collagel," a hydrous aluminum hydroxide of gel of colloidal properties, such as that produced in accordance with Moyer Patent No. 1,958,710, is intended, and the claims are to be read with this in mind.

I claim:

1. The process of producing a printing ink which comprises mixing a wet color pulp with a colloidal hydrous gel, evaporating from the resultant mixture an amount of water or moisture substantially equal to the water content of the pulp and thereupon incorporating a drying oil with the product thus obtained.

2. The process of producing a printing ink which comprises mixing wet color pulp with "collagel," evaporating from the resultant mixture an amount of water or moisture substantially equal to the water or moisture content of the color pulp, and thereupon incorporating with the product thus obtained a drying oil, triethanolamine stearate and metallo-organic driers.

3. A printing ink comprising approximately the following materials: 4.95 parts by weight of "collagel"-containing color pulp, 4.75 parts by weight of mixed drying oils containing about 5% of triethanolamine stearate, and 1.27 parts by weight of a lead manganese oxidizing agent.

4. Printing ink comprising substantially the following materials in about the amounts named: 32 parts by weight of hydrous aluminum hydroxide gel, 9.75 parts by weight of carbon black, 9 parts by weight of boiled linseed oil, 9 parts by weight of polymerized linseed oil, 8 parts by weight of litho varnish, 14 parts by weight of cobalt linoleate drier, 20 parts by weight of manganese drier, 8 parts by weight of water-soluble blue dye, sufficient triethanolamine stearate to emulsify the resultant mixture, and 4 parts by weight of a petroleum jelly.

RAMON N. SHIVA.